United States Patent
Apolonskiy et al.

(10) Patent No.: US 10,042,231 B2
(45) Date of Patent: Aug. 7, 2018

(54) METHOD AND DEVICE FOR CAVITY-ENHANCED BROADBAND INTRAPULSE DIFFERENCE FREQUENCY GENERATION

(71) Applicants: Max-Planck-Gesellschaft zur Foerderung der Wissenschaften e. V., Munich (DE); Ludwig-Maximilians-Universitaet Muenchen, Munich (DE)

(72) Inventors: Alexander Apolonskiy, Garching (DE); Ernst Fill, Garching (DE); Ioachim Pupeza, Tuerkenfeld (DE); Ferenc Krausz, Garching (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 15/503,432

(22) PCT Filed: Jul. 13, 2015

(86) PCT No.: PCT/EP2015/001437
§ 371 (c)(1),
(2) Date: Feb. 13, 2017

(87) PCT Pub. No.: WO2016/029981
PCT Pub. Date: Mar. 3, 2016

(65) Prior Publication Data
US 2017/0261834 A1    Sep. 14, 2017

(30) Foreign Application Priority Data
Aug. 25, 2014 (EP) .................................. 14002947

(51) Int. Cl.
*G02F 1/35* (2006.01)

(52) U.S. Cl.
CPC .......... *G02F 1/3534* (2013.01); *G02F 1/3501* (2013.01); *G02F 2001/3503* (2013.01);
(Continued)

(58) Field of Classification Search
CPC ................. G02F 1/3501; G02F 1/3534; G02F 2001/3507; G02F 2001/3542
See application file for complete search history.

(56) References Cited

U.S. PATENT DOCUMENTS 8,384,990 B2 * 2/2013 Vodopyanov ............. G02F 1/39
                                                                359/330
8,988,766 B2    3/2015 Russbuldt et al.
(Continued)

FOREIGN PATENT DOCUMENTS

| CN | 102879969 A | 1/2013 |
| EP | 2511751 A1 | 10/2012 |
| NO | 2012095150 A1 | 7/2012 |

OTHER PUBLICATIONS

Adler et al. "Phase-stabilized, 1.5 W frequency comb at 2.8-4.8 μm." Optics letters 34.9 (2009): 1330-1332.
(Continued)

*Primary Examiner* — Daniel Petkovsek
(74) *Attorney, Agent, or Firm* — Caesar Rivise, PC (57) ABSTRACT

A method of creating difference frequency (DF) laser pulses (1) by difference frequency generation (DFG) comprises the steps of providing ultrashort laser pulses (2) having a spectral bandwidth corresponding to a Fourier limit of below 50 fs and containing first spectral components and second spectral components having larger frequencies than the first spectral components, and driving a DFG process by the ultrashort laser pulses (2) in an optically non-linear crystal (10), wherein the DF laser pulses (1) are generated in the crystal (10) by difference frequencies between the first and second spectral components, resp., said difference frequen-
(Continued)

cies comprising third spectral components being lower in frequency than the first and second spectral components, wherein at least one enhancement cavity (20) with resonator mirrors (Mi1 to M14) spanning a beam path (22) is provided and the crystal (10) is placed in the beam path (22) of the enhancement cavity (20), the ultrashort laser pulses (2) are input coupled and coherently added in the at least one enhancement cavity (20), at least one circulating ultrashort laser pulse (3) is created in the at least one enhancement cavity (20), which drives the DFG process in the crystal (10) for generating the DF laser pulses (1), and the at least one enhancement cavity (20) is adapted for recycling the at least one ultrashort laser pulse (3) passing through the crystal (10). Furthermore, a photonic source (100) for creating DF laser pulses (1) is described, including one or more enhancement cavities.

27 Claims, 3 Drawing Sheets (52) U.S. Cl.
CPC .............. *G02F 2001/3507* (2013.01); *G02F 2001/3542* (2013.01)

(56) References Cited

U.S. PATENT DOCUMENTS

| | | | |
|---|---|---|---|
| 9,057,927 B2* | 6/2015 | Hu | G02F 1/3534 |
| 2014/0002892 A1 | 1/2014 | Russbuldt et al. | |

OTHER PUBLICATIONS

Erny et al. "Mid-infrared difference-frequency generation of ultrashort pulses tunable between 12 and 4.8 μm from a compact fiber source." Optics letters 32.9 (2007): 1138-1140.

Gambetta et al. "Milliwatt-level frequency combs in the 8-14 μm range via difference frequency generation from an Er:fiber oscillator." Optics letters 38.7 (2013): 1155-1157.

Kaindl et al. "Broadband phase-matched difference frequency mixing of femtosecond pulses in GaSe: Experiment and theory." Applied physics letters 75.8 (1999): 1060-1062.

Kaindl et al. "Femtosecond infrared pulses tunable from 9 to 18 μm at an 88-MHz repetition rate." Optics letters 23.11 (1998): 861-863.

Keilmann et al. "Mid-infrared frequency comb spanning an octave based on an Er fiber laser and difference-frequency generation." Journal of Infrared, Millimeter, and Terahertz Waves 33.5 (2012): 479-484.

Leindecker et al. "Octave-spanning ultrafast OPO with 2.6-6.1μm instantaneous bandwidth pumped by femtosecond Tm-fiber laser." Optics express 20.7 (2012): 7046-7053.

Paul et al. "Narrow linewidth single-frequency terahertz source based on difference frequency generation of vertical-external-cavity source-emitting lasers in an external resonance cavity." Optics letters 38.18 (2013): 3654-3657.

Petersen et al. "Enhanced terahertz source based on external cavity difference-frequency generation using monolithic single-frequency pulsed fiber lasers." Optics letters 35.13 (2010): 2170-2172.

Petrov. "Parametric down-conversion devices: The coverage of the mid-infrared spectral range by solid-state laser sources." Optical Materials 34.3 (2012): 536-554.

Pronin et al. "High-power 200 fs Kerr-lens mode-locked Yb:YAG thin-disk oscillator." Optics letters 36.24 (2011): 4746-4748.

Pupeza et al. "Compact 0.1-W source of octave-spanning mid-infrared femtosecond pulses centered at 10 μm." Lasers and Electro-Optics (CLEO), 2014 Conference on IEEE (2014): 1-2.

Schiffrin et al. "Optical-field-induced current in dielectrics." Nature 493 (2013): 70-74.

Schliesser et al. "Mid-infrared frequency combs." Nature Photonics 6.7 (2012): 440-449.

Seidel et al. "High-power few-cycle pulse generation by spectral broadening in bulk material." CLEO: Science and Innovations. Optical Society of America (2014): 1-2.

Vodopyanov et al. "Grating tunable 4-14 μm GaAs optical parametric oscillator pumped at 3 μm." Optics express 22.4 (2014): 4131-4136.

English language abstract for CN 102879969 A (2013).

International Search Report for PCT/EP2015/001437 dated Oct. 26, 2015.

* cited by examiner

METHOD AND DEVICE FOR CAVITY-ENHANCED BROADBAND INTRAPULSE DIFFERENCE FREQUENCY GENERATION

CROSS-REFERENCE TO RELATED APPLICATIONS

This application is the U.S. National Phase Application of PCT/EP2015/001437, filed Jul. 13, 2015, which claims priority from EP 14002947.1, filed Aug. 25, 2014, the contents of which applications are incorporated herein by reference in their entireties for all purposes.

FIELD OF THE INVENTION

The present invention comprises a method for creating broadband laser pulses, in particular broadband mid-infrared pulses (MIR pulses) by difference frequency generation (DFG). Furthermore, the present invention comprises a photonic pulse source, which is configured for creating broadband laser pulses by DFG. Applications of the invention are available e.g. in spectroscopy, high laser light field applications, analytics and measurements using femtosecond and sub-femtosecond laser pulses.

BACKGROUND OF THE INVENTION

For illustrating background art in the fields of difference-frequency generation, femtosecond (fs) lasers and enhancement cavities, reference is made to the following prior art documents.
[1] A. Schliesser et al. in "Nature Photonics" vol. 6, 2012, p. 440;
[2] O. Pronin et al. in "Opt. Lett." vol. 36, 2011, p. 4746;
[3] EP 2 511 751;
[4] EP 2 664 220;
[5] I. Pupeza et al. in CLEO 2014, Postdeadline Paper Digest, paper STh5C.7;
[6] K. L. Vodopyanov et al. in "Optics Express" vol. 22, 2014, p. 4131;
[7] F. Adler et al. in "Opt. Lett." vol. 34, 2009, p. 1330;
[8] N. Leindecker et al. in "Optics Express" vol. 20, 2012, p. 7046;
[9] F. Keilmann et al. in "Journal of Infrared, Millimeter, and Terahertz Waves" vol. 33, 2012, p. 479;
a[10] A. Gambetta et al. in "Opt. Lett." vol. 38, 2013, p. 1155;
[11] A. Shiffrin et al. in "Nature" vol. 493, 2013, p. 70;
[12] M. Seidel et al. in "CLEO 2014" Postdeadline Paper Digest, paper STh5C.9;
[13] V. Petrov in "Optical Materials" vol. 34, 2012, p. 536;
[14] E. B. Petersen in "Opt. Lett." vol. 35, no. 13, 2010, p. 2170;
[15] J. R. Paul et al. in "Opt. Lett." vol. 38, no. 18, 2013, p. 3654;
[16] R. A. Kaindl et al. in "Appl. Phys. Lett." 75, 1999, p. 1060;
[17] R. A. Kaindl et al. in "Opt. Lett." 23, 1998, p. 861;
[18] C. Erny et al. in "Opt. Lett." 32, 2007, p. 1138; and
[19] CN 102 879 969 A.

Broadband MIR radiation has multiple applications in physics and chemistry, e.g. for measuring purposes or analytics. As an example, broadband MIR radiation is useful for generating few-cycle pulses for time-resolved experiments in physics, e.g. for controlling the properties of transparent dielectrics with light (see [11]). In this case radiation of long wavelength will be capable of transferring electrons between well-separated electrodes (several µm), important for realizing a prototype of a fast switch. Another example of the use of broadband MIR radiation is optical breath analysis aimed at fast non-invasive health diagnostics: all gas molecules have fundamental (i.e. very strong) absorption lines, holding thus a promise to detect them even in small concentrations, down to one part per trillion. The sensitivity of such a method increases with increasing MIR power.

It is a generally known practice to create narrowband or broadened MIR radiation using the non-linear process of optical parametric amplification (OPA) in an optically non-linear crystal. OPA is a coherent process allowing for the energy transfer of a higher-frequency spectral component (pump) to a lower-frequency spectral component (signal) intersecting in the crystal. Energy conservation leads to the generation of a third spectral component (idler) with a frequency corresponding to the difference of the first two. In the particular case, in which energy transfer of both signal and pump radiation to the idler is of interest, this non-linear process is referred to as difference-frequency generation (DFG). Conventionally, the pump light has a higher power compared with the signal light. If the signal light has a power which approximately is equal to that of the pump light, other terms can be introduced and the signal light, pump light and idler light (referring to OPA) correspondingly are called in the following first, second and third spectral components (referring to DFG).

If the optically non-linear crystal for OPA is placed in a laser resonator, this device is referred to as an optical parametric oscillator (OPO). Most of the generally known OPO schemes fall into the following categories: first one, called the singly resonant OPO, has highly reflective mirrors either for the signal or the idler wave. The second one, called the doubly resonant OPO, has two versions: with i) highly reflective mirrors for both signal and idler and ii) highly reflective mirrors for the pump and idler. The existing OPO systems cover the range of interest between e.g. 4 to 14 µm by tuning the generated narrowband (less than 1 µm) spectrum [6].

The output power in such a narrowband mode of operation can reach 1.5 W [7]. The most broadband (but very structured) supercontinuum realized so far in the doubly resonant OPO, reached 37 mW at the −30 dB level; in the range of 2.6 to 6.1 µm [8].

Although the spectral range up to 20 µm could be covered with several OPOs, the OPO approach itself does not allow to make it both broadband and powerful at the same time. This results in particular from the inherent problem that there are no low-loss broadband mirrors in the mid-infrared. Metal mirrors can support broad mid-infrared spectrum, at the expense of losses of the order of 1% per bounce. This means that it is very problematic to build a high-finesse double-resonant OPO cavity and to generate high-power broadband mid-infrared by using the OPO approach.

A direct way of generating broadband MIR radiation by using 1-octave fundamental spectrum from a fs fiber laser and nonlinear fiber in conjunction with a DFG crystal has been proposed, e.g. in [16] or [1]. A phase-stable train of ultrashort laser pulses (fs laser pulses) is described in frequency space as a frequency comb consisting of frequency components ("teeth" of the comb). The fs laser pulses simultaneously contain spectral components in different frequency ranges. According to [1], difference frequencies can be generated among the spectral components (teeth of the single comb). This concept has been experimentally shown e.g. by I. Pupeza et al. [5], where 24 fs laser pulses have been used for driving a DFG process in a DFG crystal resulting in MIR radiation having a power of about 50 mW to 100 mW in a range of about 6 µm to 13 µm. According to [15], the DFG crystal is not arranged in an enhancement cavity. Further experiments resulted in mW-level spectra from 8 to 18 µm [9, 10].

The practical application of the conventional creation of broadband MIR radiation using DFG with fs laser pulses is restricted as a result of the relatively low power of the MIR radiation in the mW range. This disadvantage is caused by the fact that two desirable properties of high power and broad bandwidth usually impose opposite requirements to the nonlinear crystal. To obtain high power, the interaction volume of the different radiation components in the crystal needs to be maximized. Due to chromatic dispersion (and birefringence) this limits the optical bandwidth, over which efficient phasematching can be achieved, resulting in a narrowband idler beam. Customarily, to obtain high power at a given idler frequency, the orientation of the crystal with respect to the pump and signal beams is tuned. To overcome this complication and increase the phasematching bandwidth, the thickness of the crystal can be reduced. This, however, comes at the cost of a significantly reduced generated MIR power.

Driving a DFG process with increased power has been proposed in [14], wherein the DFG crystal has been arranged in an optical cavity. Nanosecond pulses from two separate laser pulse sources having different output wavelengths are coupled into the optical cavity, where the DFG process is obtained with an enhancement factor of 7. Similarly, a continuous wave, single-frequency terahertz (THz) source emitting 1.9 THz has been proposed in [15], wherein two separate laser sources drive the DFG process within the non-linear crystal located in an optical cavity. However, these techniques provide narrowband THz radiation only, i.e. narrowband wavelengths in a range of up to 1 mm. As a further disadvantage, the use of two separate laser pulse sources result in structural complexity of the optical setup.

Further schemes of generating mid-infrared light are described in [17] to [19]. As a limitation, these techniques are also restricted to the generation of tunable narrowband radiation in the mid-infrared range, e.g. in the range of 9 to 18 µm [17] or 3.2 µm to 4.8 µm [18], having relatively low efficiency and power.

OBJECTIVE OF THE INVENTION

The objective of the invention is to provide an improved method for creating broadband laser pulses by difference frequency generation, in particular for creating broadband MIR pulses by a DFG process, which is capable of avoiding disadvantages of conventional techniques. In particular, the objective is to provide a method for creating broadband laser pulses with increased power, improved broadband features and/or reduced complexity of the optical setup. Furthermore, the objective of the invention is to provide an improved photonic pulse source, which is configured for creating broadband laser pulses by a DFG process, which is capable of avoiding disadvantages of conventional laser oscillators and which in particular is adapted for implementing the inventive method for creating broadband laser pulses.

SUMMARY OF THE INVENTION

The above objectives are solved by a method and a photonic pulse source of the invention.

According to a first general aspect of the invention, the above objective is solved by a method of creating difference frequency laser pulses (in the following: DF laser pulses), in particular MIR laser pulses by DFG. Ultrashort laser pulses (driving laser pulses) simultaneously contain first spectral components and second spectral components having larger frequencies than the first spectral components. Preferably, the ultrashort laser pulses have a spectral bandwidth corresponding to a Fourier limit of below 50 fs, in particular below 20 fs or even below 10 fs. The ultrashort laser pulses are coupled into a first optically non-linear crystal for driving a DFG process. The DF laser pulses are generated in the first optically non-linear crystal by difference frequencies between the first and the second spectral components, resp. (intrapulse difference frequency generation). The amounts of said difference frequencies provide third spectral components having lower frequencies than both of the first and second frequency components. Contrary to conventional techniques, the DF laser pulses do not provide narrowband radiation, but are broadband pulses.

According to the invention, the first optically non-linear crystal is placed in a first enhancement cavity. The first enhancement cavity comprises resonator mirrors forming a beam path. A resonator length of the first enhancement cavity is matched with a repetition rate of the ultrashort laser pulses or integer multiples thereof. The ultrashort laser pulses are coupled into and coherently added in the first enhancement cavity, resulting in one or more circulating ultrashort laser pulse(s), preferably one single circulating ultrashort laser pulse. The circulating ultrashort laser pulse is created by a linear, coherent superposition of the ultrashort laser pulses initially coupled into the first enhancement cavity. Furthermore, according to the invention, the DFG process is driven by the circulating ultrashort laser pulse. Accordingly, the ultrashort laser pulses firstly are added to form the enhanced circulating ultrashort laser pulse, which passes the first optically non-linear crystal and creates one DF laser pulse per passage through the crystal. The first enhancement cavity is adapted for recycling the ultrashort laser pulse passing through the first optically non-linear crystal by adding the input coupled ultrashort laser pulses, so that a train of DF laser pulses is created. Finally, the DF laser pulses are output coupled from the first enhancement cavity, i.e. they are emitted out of the beam path of the enhancement cavity.

According to a second general aspect of the invention, the above objective is solved by a photonic pulse source, which is configured for creating DF laser pulses by DFG, in particular an MIR pulse source, and preferably using the method according to the above first aspect of the invention. The photonic pulse source comprises a first optically non-linear crystal being capable of creating the DF laser pulses by a DFG process driven with ultrashort laser pulses, which simultaneously containing first spectral components and second spectral components having larger frequencies than the first spectral components. The DF laser pulses are created by difference frequencies between the first and second spectral components, said difference frequencies comprising third spectral components being lower than both of the first and second frequency components. According to the invention, the photonic pulse source includes a first enhancement cavity with first resonator mirrors spanning a first beam path, wherein the first optically non-linear crystal is placed in the first beam path. One of the first resonator mirrors is arranged for input coupling of the ultrashort laser pulses into the first enhancement cavity, and the first enhancement cavity further includes an output coupling component being arranged for output coupling of the DF laser pulses from the first enhancement cavity, in particular from the beam path thereof.

Depending on the matching of the cavity resonator length relative to the repetition rate of the driving ultrashort laser pulses, one single circulating ultrashort laser pulse or multiple, e.g. 2, 3 or more, circulating ultrashort laser pulses are provided in the enhancement cavity by coherent addition of the driving ultrashort laser pulses. In the present description of the invention, reference is made to the case of one single circulating ultrashort laser pulse. The invention is not restricted to this case, but rather can be implemented with multiple circulating ultrashort laser pulses in equal manner, wherein each of the multiple circulating ultrashort laser pulses drives the DFG process in the optically non-linear crystal.

As the main advantage of the invention, the photonic, in particular MIR source, is proposed, in which broad bandwidth and high power are simultaneously achieved by driving DFG in the crystal placed in the beam path of the femtosecond enhancement cavity. In the setup, the pump and signal radiation components are spectral components of an ultrashort laser pulse (e.g. <30 fs, preferably few-cycle) propagating along a single beam in the cavity. While the crystal supports the generation of a broad MIR bandwidth (supercontinuum generation), this process exhibits a low single-pass efficiency. This, in turn enables an efficient enhancement of the circulating pulse (simultaneously acting as pump and signal) to kW-scale average-powers and possibly beyond. Consequently, despite the low single-pass conversion efficiency, the generated MIR idler radiation can reach high values due to the high circulating power of the driving signal/pump pulse. The OPA process typically is conducted with signal light having an essentially lower power than the pump light. On the contrary, as the inventive intrapulse DFG uses spectral components (teeth) of the frequency comb representing the circulating ultrashort laser pulse in a lower and higher spectral range thereof, the first spectral component (corresponding to signal light) has a power which approximately is equal to that of the second spectral component (corresponding to pump light). The inventors have found that this similar power of the first and second spectral components yields an important advantage of the invention facilitating the driving of the DFG process by the circulating ultrashort laser pulse in the enhancement cavity.

As a further advantage, the invention allows a frequency conversion over a broad spectral bandwidth with a thin crystal avoiding problems with phase matching and walk-off effects. The crystal may have a lower conversion efficiency compared with conventional OPA processes, which is compensated by the enhancement of the driving ultrashort laser pulses in the enhancement cavity.

The term "DF laser pulses" refers to any laser pulses composed of frequencies of the third spectral component. The centre wavelength of the DF laser pulses (output wavelength of the photonic pulse source) can be located in any spectral range from 1 µm upwards. With a preferred application of the invention, the centre wavelength of the DF laser pulses is in the MIR range, i.e. the MIR laser pulses have a wavelength in a range from 2 µm to 20 µm, in particular a wavelength of at least 2 µm, e.g. at least 4 µm and/or at most 20 µm. The DF laser pulses created according to the invention have a broadband spectrum, i.e. they have a spectral width of at least 500 nm, in particular at least 1 µm, e.g. 15 µm or more.

The term "enhancement cavity" refers to any passive resonator made of plane and/or curved mirrors being adapted for a coherent superposition of the ultrashort laser pulses (femtosecond enhancement cavity). The enhancement cavity comprises at least two resonator mirrors forming a beam path of either a standing or a running wave cavity configuration. Preferably, the enhancement cavity does not contain an active laser medium. The enhancement factor of the enhancement cavity can be selected in dependency on the particular application of the invention, and it is e.g. at least 10, in particular 100, or even 500 or more. Preferably, the enhancement cavity is operated in an evacuated environment, e.g. in a vacuum of $10^{-2}$ mbar, or in a water-free gas with minimized dispersion, like e.g. helium or nitrogen.

The optically non-linear crystal (also briefly called "crystal" in the following) is any transparent crystal having an optical non-linearity and birefringence over the spectral range of interest of the driving circulating ultrashort laser pulses. Preferably, the crystal exhibits a high damage threshold and mechanical stability. Before the invention, experts have expected that a crystal with these properties would not be available. However, the inventors have found that suitable crystal materials are available, like e.g. $LiGaS_2$ used by I. Pupeza et al. [5] or further crystals described in [13], which tolerate a pulse average power in the W or even kW range. Preferably, a thin crystal is used, which has a thickness of at least 1 µm, in particular at least 5 µm and/or at most 5 mm, in particular at most 10 mm. According to a further preferred feature, the crystal can be provided with an antireflective coating on a front side (surface facing to the incident circulating ultrashort laser pulse) thereof, thus reducing Fresnel reflections in the cavity. Furthermore, the crystal can be arranged such that the angle of incidence of the circulating ultrashort laser pulse is the Brewster angle. This feature is preferably provided with the type II phase matching in the crystal.

The invention has the following further advantages. Based on the current state of the art, the enhancement of 15-fs pulses to an average power of about 5 kW at a repetition rate around 100 MHz will allow the creation of Watt-scale broadband MIR frequency combs extending from e.g. about 4 µm to about 20 µm. This represents a dramatic improvement over the conventional MIR frequency combs [1] and will have a significant impact on applications ranging from fundamental science to medical diagnosis. Moreover, the inventive source is compact, the footprint of the enhancement cavity being on the order of 0.5×1 m². As a further advantage, the invention requires highly reflective mirrors only for the driving ultrashort laser pulses, making it very attractive because of the existing technology for high-quality mirrors at 1 µm.

Contrary to [14] and [15], the invention uses broadband pump radiation (driving ultrashort laser pulses) and creates broadband DF pulses, in particular in the MIR range. The difference frequencies are obtained from the spectral components included in one laser pulse (intrapulse DFG). Accordingly, one laser source is required only, so that the optical setup is improved compared with [14] and [15]. Furthermore, the generated frequency comb of the DF laser pulses has a negligible carrier-envelope offset frequency. With further contrast to [14] and [15], the invention offers new spectral ranges in IR and MIR which have particular advantages in highly resolving spectroscopy.

According to a preferred embodiment of the invention, the step of output coupling of the DF laser pulses comprises relaying the DF laser pulses out of the first beam path using a reflecting dichroic surface with a wavelength dependent reflectance. The circulating ultrashort laser pulse can pass the reflecting dichroic surface, while the DF pulses are reflected, or vice versa. This embodiment of relaying the DF laser pulses via a dichroic surface has advantages in terms of obtaining smooth profiles of the DF laser pulses.

Preferably, the reflecting dichroic surface comprises a rear side of the first optically non-linear crystal, which additionally has an antireflective coating with anti-reflective properties for all first, second and third spectral components on a front side thereof. With this embodiment, the DF laser pulses can be reflected out of the first beam path using the reflecting dichroic surface and the antireflective coating of the crystal.

Alternatively, a surface of a resonator mirror, preferably of the first resonator mirror downstream of the first optically non-linear crystal, can have dichroic properties allowing a passage of the DF laser pulses, while the circulating ultrashort laser pulse is reflected along the cavity beam path.

As a further option, a surface of a dichroic plate arranged in the first enhancement cavity can be used for reflecting the DF laser pulses out of the cavity beam path.

According to an alternative preferred embodiment of the invention, the step of output coupling of the DF laser pulses comprises relaying a divergent portion of the DF laser pulses over one of the resonator mirrors or an auxiliary mirror with a hole transmitting the circulating ultrashort laser pulse in the first enhancement cavity. This embodiment of relaying the DF laser pulses has advantages in terms of avoiding an effect of the output coupling on the pulse enhancement in the cavity.

According to a further advantageous feature of the invention, the ultrashort laser pulses to be coupled into the first (and any further, see below) enhancement cavity are generated with one single laser source. Advantageously, as a preferred source of the driving ultrashort laser pulses a compact (0.6×1.5 m$^2$) thin-disk oscillator can be used as described in [2]. Such a system operating at 1 μm wavelength yields 15 fs pulses on the 20 W average power level.

According to a further preferred feature of the invention, spectral components of the ultrashort laser pulses are suppressed, which do not contribute to the DFG process. This provides advantages for the efficiency of the DFG process. The spectrum of the ultrashort laser pulses is created as broad as possible, e.g. by a pulse compression within a fs laser (see [2]). The resulting frequency comb of the ultrashort laser pulses includes the first and second spectral components for the DFG process, respectively. In a central frequency range between the first and the second spectral components, spectral components do not generate useful MIR radiation via DFG, as they have very small frequency differences only. Accordingly, these spectral components can be suppressed without a negative influence on the DFG process. With the suppression, the thermal influence on the optically nonlinear crystal is reduced and the design of the resonator mirrors is facilitated. The central spectral components can be suppressed using a spectral shaping component, like a notch filter or two edge filters.

According to a further preferred embodiment of the invention, the polarization of the first spectral components relative to the polarization of the second spectral components of the ultrashort laser pulses are adjusted relative to each other, so that the polarizations of the first and second spectral components are parallel or perpendicular relative to each other. Thus advantages for optimizing phase matching conditions are obtained. Particularly preferred is a variant, wherein the polarizations of the first and second spectral components are adjusted before input coupling the ultrashort laser pulses into the first enhancement cavity.

With the most common types of phase matching (type I and type II), the first and second spectral components are required to propagate through the crystal in planes exhibiting different refractive indices (the ordinary and the extraordinary plane). As a consequence, the optical length of the cavity will be different in these two planes, resulting in a delay (temporal walk-off) of typically a few femtoseconds between the two radiation components. To avoid a spectral filtering in the cavity inherent to locking the driving pulse to only one optical length, additional measures can be taken. Preferably, a second optically non-linear crystal is placed in the beam path of the first enhancement cavity, wherein the second optically non-linear crystal is arranged for compensating for an ellipticity of the polarization of the light field circulating in the first enhancement cavity, said ellipticity being generated in the first optically non-linear crystal. Preferably, the second optically non-linear crystal is rotated around the beam axis under an adequate angle (e.g. 45 degrees) relative to the first optically non-linear crystal. As a further advantage, the second optically non-linear crystal can be adapted for creating further difference frequencies within the third spectral component by difference frequency generation. Thus, the overall efficiency of the DFG process is improved.

According to a particularly preferred embodiment of the invention, at least one further enhancement cavity, e.g. a second enhancement cavity including a plurality of second resonator mirrors is provided which is arranged relative to the first enhancement cavity such that the first optically non-linear crystal is placed in both of the first and second enhancement cavities. The beam paths of both cavities intersect each other, and the first optically non-linear crystal for the DFG process is arranged at the intersection of the beam paths. Pulse portions of the ultrashort laser pulses including different spectral components are coupled into and coherently added in both of the first and second enhancement cavities, so that one pulse portion is circulating as an ultrashort laser pulse in each of the first and second enhancement cavities, resp. The polarization of the pulse portions coupled into the first and second enhancement cavities are adjusted such that the first circulating ultrashort laser pulse in the first enhancement cavity has another, e.g. perpendicular, polarization at the first optically non-linear crystal compared with the second circulating ultrashort laser pulse in the second enhancement cavity.

As a main advantage, this embodiment with at least two separate cavities ideally solves the task of providing orthogonal polarizations for type I phase matching. As a further advantage, in the multi-cavity embodiment output coupling is no challenge, because the third radiation component leaves the crystal under a different angle than all other radiation components.

The latter embodiment is not restricted to just two enhancement cavities. Two or more further enhancement cavities can be provided, wherein each of the first and the two or more further enhancement cavities is arranged for coherently adding pulse portions with different spectral content and different polarizations. For instance, one could adjust the angles of incidence of the beams in a second and third enhancement cavity with slightly different spectra on the crystal to phase match different frequency components with the beam in the first enhancement cavity.

The embodiments with multiple enhancement cavities have the following further advantages. Firstly, the phase matching in the optically non-linear crystal can be improved. Additional degrees of freedom are provided for the phase matching by adjusting the angles of incidence of the individual beams on the crystal. The polarization can be rotated in each of the enhancement cavities independently of the polarization in the remaining cavities. Furthermore, the requirements to the bandwidth of each cavity are facilitated as the bandwidth of the resonator mirrors can be matched to the corresponding spectral components. Furthermore, with different angles of incidence of the pulse portions on the optically non-linear crystal, the phase matching condition can be fulfilled in an enlarged wavelength range, thus improving the conversion efficiency and/or the bandwidth of the DFG process. The DF laser pulses, in particular the MIR radiation can be created with an increased power and/or bandwidth. Furthermore, the polarization of the pulse portions at the location of the optically non-linear crystal can be optimized. Although the spectral components of each of the pulse portions are subjected to different refractive indices, the corresponding differences in the optical path length can be compensated by movable resonator mirrors. Accordingly, the provision of a second optically non-linear crystal in the enhancement cavities can be omitted.

Advantageously, multiple measures are available for adjusting the optically non-linear crystal(s). Firstly, the temperature of the first optically non-linear crystal can set by contact with one of the first resonator mirrors or with a temperature-control support stage (temperature-control mount), wherein the first optically non-linear crystal is optically contacted or attached to the one of the first resonator mirrors or the temperature-control support stage. Contacting the crystal to the surface of a resonator mirror might also allow for using this optic as a dichroic output coupler as suggested above. Accordingly, as the crystal can be subjected to circulating powers on the kW level, an efficient transport of the heat generated by residual absorption at the involved frequencies is obtained. Secondly, an adjusting support stage can be provided for adjusting an orientation of the first optically non-linear crystal with respect to the first beam path of the first enhancement cavity. In particular, the adjusting support stage can be adapted for setting two angles of orientation with respect to the beam path in the cavity.

BRIEF DESCRIPTION OF THE DRAWINGS

Further details and advantages of the invention are described in the following with reference to the attached drawings, which show in.

DESCRIPTION OF THE PREFERRED EMBODIMENTS

Preferred embodiments of the invention are described in the following with particular reference to an arrangement of at least one optically non-linear crystal in one or more enhancement cavities, driving the DFG process with fs laser pulses in the enhancement cavity, controlling the polarization of the fs laser pulses circulating in the enhancement cavity and coupling the created DF laser pulses out of the beam path of the enhancement cavity. Details of creating and manipulating the driving fs laser pulses are not described as far as they are known from prior art (see e.g. [2], [4] and [12]). It is emphasized that the practical implementation of the invention is not restricted to the described examples, but rather possible with modifications, e.g. in terms of the number of enhancement cavities, the available types of optically non-linear crystals (see [13]), the number of circulating ultrashort laser pulses, and the design of the enhancement cavity. Most of the illustrated embodiments show the optically non-linear crystal with a distance from the resonator mirrors. Alternatively, the optically non-linear crystal can be positioned in direct contact with one of the resonator mirrors (see FIG. 6).

Figure 1:
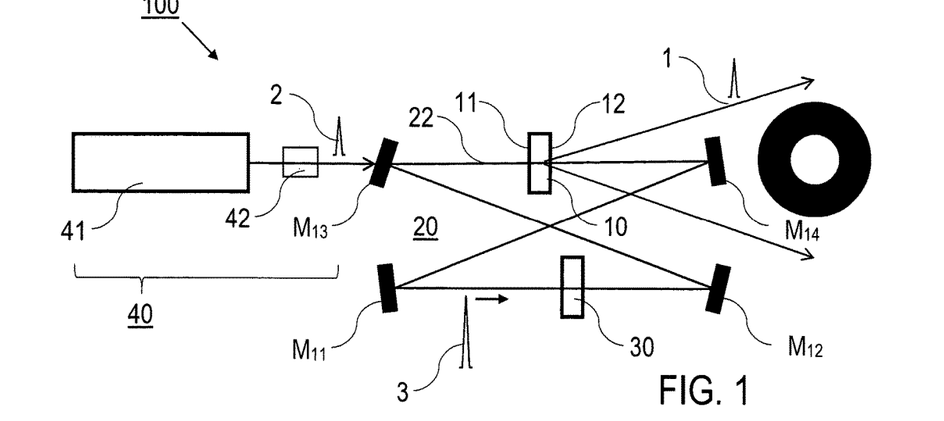
FIG. 1: a schematic illustration of a first embodiment of a photonic pulse source according to the invention, including one single enhancement cavity.

FIG. 1 illustrates a first embodiment of a photonic pulse source 100 comprising a first optically non-linear crystal 10, an enhancement cavity 20, a second optically non-linear crystal 30, and a laser source 40. Additionally, the photonic pulse source 100 is provided with a control device (not shown) and a monitoring device with at least one optical sensor (not shown), as they are known form conventional enhancement cavity techniques, e.g. for controlling the repetition frequency driving laser source, the input coupling of the driving ultrashort laser pulses and the positions of cavity mirrors and monitoring pulse parameters.

The laser source 40 comprises a fs laser 41 and optionally a spectral shaping component 42. The fs laser 41 is adapted for providing ultrashort laser pulses 2 having e.g. a centre wavelength of 1030 nm, an average power of 50 W and a repetition rate of 100 MHz. The fs laser source 41 may comprise e.g. a commercial apparatus, like a Kerr-lens modelocked Yb:YAG thin-disk laser or a chirped-pulse amplified master oscillator or an optical set-up with a combination of a thin-disk oscillator and one or two broadening stages as described in [2] or [12].

The spectral shaping component 42 is arranged for shaping the spectrum of the ultrashort laser pulses 2. Spectral components, which do not contribute to the generation of useful radiation of the third spectral component in the optically non-linear crystal 10 are attenuated or even completely suppressed. To this end, the spectral shaping component 42 comprises e.g. a notch filter (in reflection or transmission) having a preselected filter characteristic depending on the spectral components to be suppressed.

The enhancement cavity 20 comprises four resonator mirrors $M_{11}$ to $M_{14}$, which are arranged to span a beam path 22 for a circulating laser pulse 3. Preferably, the beam path 22 extends in a plane parallel to the drawing plane. The length of the beam path 22 is selected such that the period of the circulating laser pulse 3 is equal to the reciprocal repetition frequency of the laser source 40 or an integer multiple of the latter. The ultrashort laser pulses 2 generated with the laser source 40 are coupled into the enhancement cavity 20 at one of the resonator mirrors $M_{13}$, which has a slightly reduced reflectivity, e.g. 99%, compared with the remaining resonator mirrors. The resonator mirrors $M_{11}$ to $M_{14}$ have plane or curved mirror surfaces, as it is known from conventional enhancement cavities. Curved mirror surfaces can be used for tailoring the field distribution of the circulating laser pulse 3, e.g. for focussing the circulating laser pulse 3 at predetermined focus positions along the beam path 22, and/or for improving the optical stability of the pulse enhancement in the cavity.

The first optically non-linear crystal 10 is arranged in a first section of the beam path 22 between two of the resonator mirrors $M_{13}$ and $M_{14}$, preferably at a focus position of the beam path 22. With a practical example, the optically non-linear crystal 10 is made of $LiGaS_2$, having a thickness along the beam path direction of 100 μm. The optically non-linear crystal 10 is supported by an adjusting and/or temperature-control support stage 13, 14 (see FIGS. 2, 3), which is adapted for geometrically adjusting and/or cooling the optically non-linear crystal 10.

Additionally, a second optically non-linear crystal 30 is arranged in another section of the beam path 22, preferably also at a position between two resonator mirrors $M_{11}$ and $M_{12}$, where the transverse intensity profile of the circulating laser beam 22 is widened to mitigate non-linearity and thermal lensing. The second optically non-linear crystal 30 is arranged for compensating an ellipticity of the polarization introduced by the interaction of the circulating laser pulse 3 with the first optically non-linear crystal 10. Preferably, the second optically non-linear crystal 30 has a thickness like the first crystal 10 or a different thickness, e.g. 200 μm.

The DFG process is driven by the circulating laser pulse 3 in the first optically non-linear crystal 10. The DF laser pulses 1 are generated with frequency components (third frequency components) created by difference frequencies between first and second spectral components of the circulating laser pulse 3, respectively. The DFG process requires that a phase matching condition is fulfilled by the first and second frequency components in the optically non-linear crystal 10. Various types of phase matching conditions are available. According to preferred embodiments of the invention, the first and second frequency components have polarizations perpendicular to each other (type I phase matching) or parallel to each other (type II phase matching).

Figure 7:
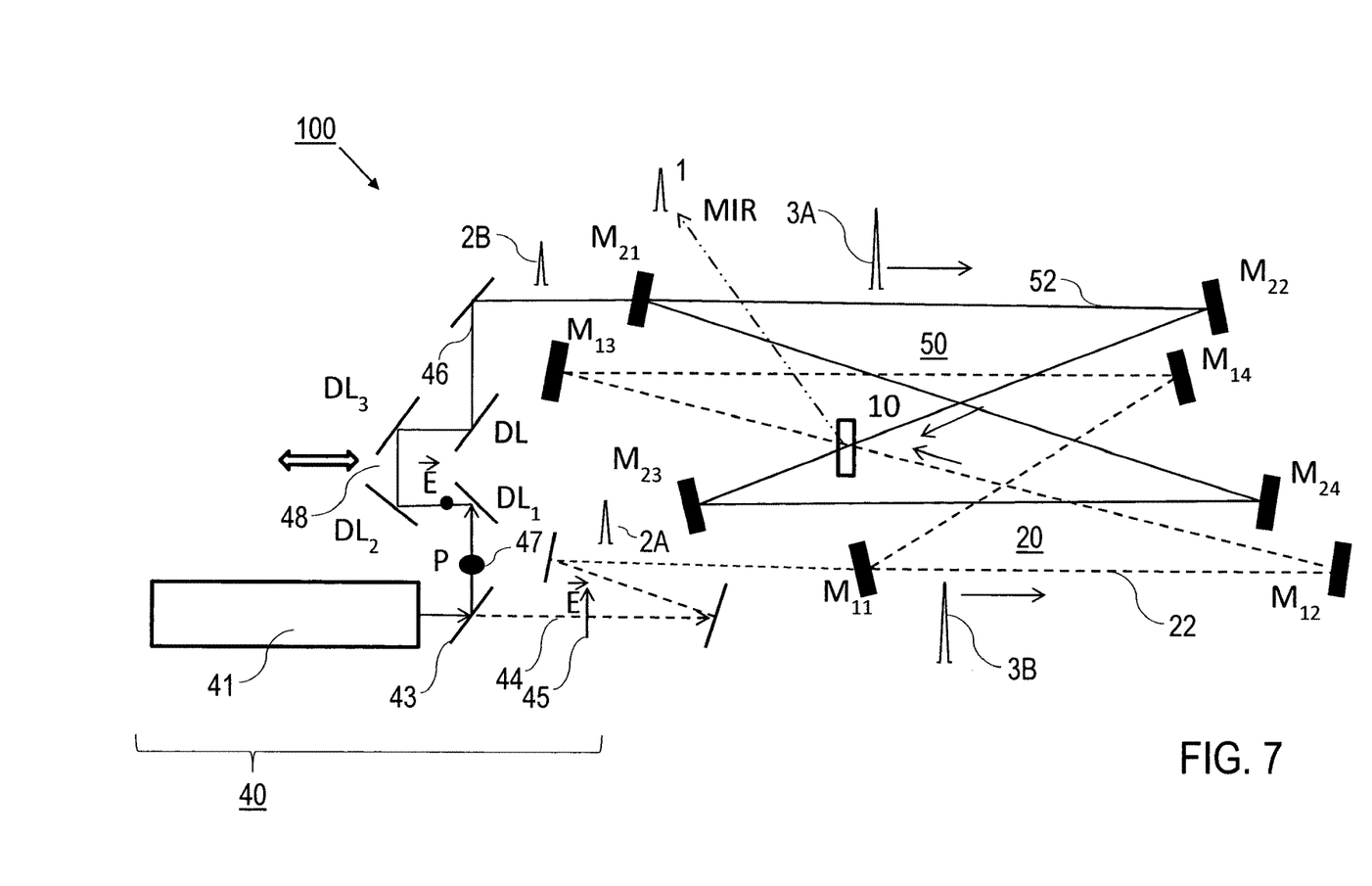
FIG. 7: a schematic illustration of a second embodiment of a photonic pulse source according to the invention, including two enhancement cavities.

The two mutually perpendicular polarizations for providing the type I phase matching can be created even with the first and second frequency components being simultaneously contained in the single circulating laser pulse 3, e.g. by using elliptic polarization or by constructing the circulating laser pulse 3 from two partial pulses (see FIG. 7).

The second optically non-linear crystal 30 is preferably provided with an embodiment using the type I phase matching. Both of the first and second spectral components having mutually perpendicular polarizations are subjected to different refractive indices in the optically non-linear crystal 10, which has an effect like a quarter wave plate. This results in a circular polarization of the circulating laser pulse 3 after the passage through the optically non-linear crystal 10. By the effect of the second optically non-linear crystal 30, this effect is compensated. To this end, the second optically non-linear crystal 30 preferably is located at a position where the transverse intensity profile of the circulating laser pulse 3 has a diameter significantly larger than on the first crystal 10. Accordingly, the second optically non-linear crystal 30 is not used if the DFG is based on the type II phase matching.

Additionally, the second optically non-linear crystal 30 can be capable of creating further difference frequencies by a DFG process. In particular, the orientation and the material of the second optically non-linear crystal 30 can be selected such that the above compensation of the polarization effect of the first optically non-linear crystal 10 is incomplete, but phase matching conditions for a further DFG process are fulfilled. Accordingly, a second DF laser pulse can be generated at the second optically non-linear crystal 30 (not shown in FIG. 1).

The polarizations of the first and second spectral components can be adjusted before input coupling the ultrashort laser pulses 2 into the enhancement cavity 20, e.g. by introducing a wavelength-selective beam splitter, distributing the output of the fs laser 41 onto two different beam paths, rotating the polarization in at least one of the beam paths with at least one polarizing components and recombining both portions into a common fs laser pulse 2 (not shown in FIG. 1). Alternatively, the fs laser pulses 2 at the output of the fs laser 41 can be polarized with one single polarizing component rotating the polarization of the complete spectrum of the fs laser pulses 2 onto an intermediate angle. With this embodiment, the type I phase matching can be obtained by rotating the first and second optically non-linear crystals 10, 30, respectively.

The DF laser pulses 1 created in the first optically non-linear crystal 10 are emitted collinearly with the beam path 22 direction within the enhancement cavity 20, but with an increased divergence. Accordingly, an output coupling around one of the resonator mirrors $M_{14}$ as shown in FIG. 1 or in particular according to one of the variants shown in FIGS. 2 to 5 can be provided.

With a modification of FIG. 1, only one optically non-linear crystal 10 can be provided. The second optically non-linear crystal 30 is not strictly necessary if a certain degree of the conversion efficiency of the DFG process can be tolerated in dependency on the particular application of the invention.

The intensity generated in the DFG process with input at the two high frequencies is proportional to $z^2$ $\text{sinc}^2(z/z_{coh})$, where z and $z_{coh}$ are the crystal thickness and the coherence length respectively. The coherence length is given by $z_{coh}=2/\Delta k$, where $\Delta k$=wavevector mismatch. Writing the above expression as $z_{coh}^2$ $(z/z_{coh})^2$ $\text{sinc}^2$ $(z/z_{coh})$ it results that for a short coherence length the DFG-efficiency becomes very low. The function $(z/z_{coh})^2$ $\text{sinc}^2(z/z_{coh})$ has a maximum of one at z=1.6 $z_{coh}$ and thus the optimum crystal thickness is slightly larger than the coherence length.

For monochromatic or narrowband radiation the choice of a suitable phase matching angle generates a $\Delta k$ close to zero, resulting in a large coherence length. However, with broadband radiation there is no unique phase matching angle and $z_{coh}$ rapidly decreases with increasing bandwidth. The optimum length of the crystal depends on many parameters, such as the particular crystal, the bandwidth and the choice of phase matched frequencies.

Figure 2:
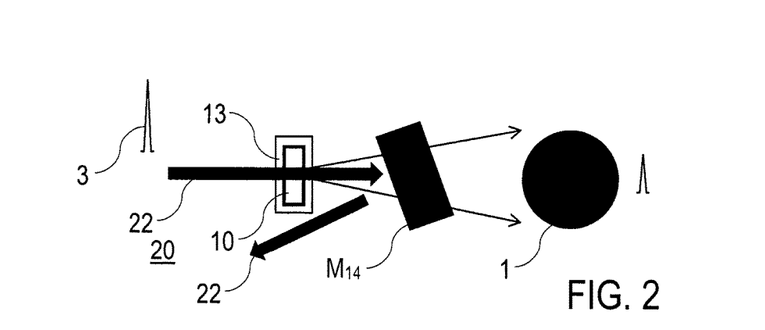
FIGS. 2 to 5: schematic illustrations of various techniques for output coupling MIR pulses out of the enhancement cavity.

FIG. 2 shows a portion of the enhancement cavity 20 with one of the resonator mirrors $M_{14}$ and the first optically non-linear crystal 10 only. The resonator mirror $M_{14}$ is a dichroic mirror that transmits the third spectral components of the DF laser pulses 1, in particular in the MIR wavelength range, and reflects the first and second spectral components of the circulating laser pulse 3 along the beam path 22. Accordingly, output coupling of the DF laser pulses 1 is obtained by passing them through one of the resonator mirrors, e.g. $M_{14}$.

Additionally, FIG. 2 schematically shows an adjusting support stage 13, which accommodates the first optically non-linear crystal 10. The adjusting support stage 12 comprises e.g. a piezoelectric x-y-z- and tip-tilt drive, which is capable of adjusting an orientation and position of the first optically non-linear crystal 10 relative to the first beam path 22.

As a general important feature of the invention, the angle of incidence of the circulating laser pulse 3 on the beam path 22 relative to the surface of the optically non-linear crystal 10 influences the phase matching. As the phase matching condition depends on the crystallographic orientation of the optically non-linear crystal 10, an adjustment of the geometrical orientation and position of the optically non-linear crystal 10 relative to the beam path 22 is implemented. Preferably, the adjustment is controlled with the adjusting support 13. As an example, a feedback control can be provided. A control variable can be obtained with an optical sensor (not shown), monitoring the spectral characteristic of the DF laser pulses 1. In dependency on the control variable, the crystal adjustment can be controlled such that a certain spectral range of the emitted DF pulses 1 is obtained. Alternatively, an optimum emission spectrum within a broader spectral range can be selected. With a thicker optically non-linear crystal, which creates a narrow bandwidth of the DF laser pulses 1, the wavelength range of the DF laser pulses 1 can be tuned by the adjusting support 13.

Figure 3:
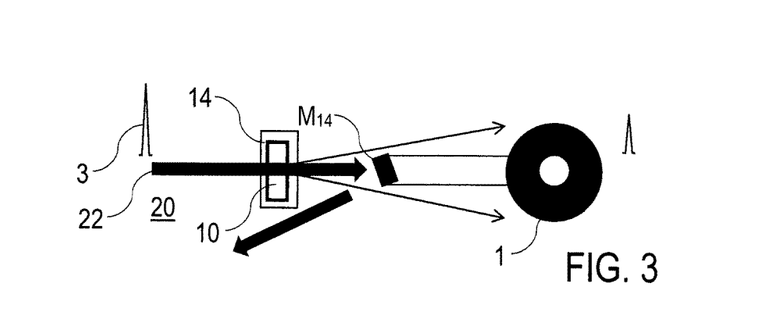

According to FIG. 3, the DF laser pulses 1 are coupled out of the enhancement cavity 20 by using the larger divergence of the DF laser pulses 1 compared with the transverse mode size of the circulating light pulse 3 (as shown in FIG. 1). One of the cavity mirrors $M_{14}$ downstream from the first optically non-linear crystal 10 has a diameter, which is comparable to the $1/e^2$-intensity diameter of the transverse mode of the circulating laser pulse 3 at this mirror $M_{14}$. The DF laser pulses 1 can pass outside the mirror $M_{14}$, so that a ring-shaped output is created.

Additionally, FIG. 3 schematically shows a temperature-control support stage 14, which is adapted for adjusting the temperature of the first optically non-linear crystal 10, e.g. cooling with Peltier elements or with water or heating with a heating coil. According to a further variant of the invention, both of the adjusting support stage 13 (FIG. 2) and the temperature-control support stage 14 (FIG. 3) can be provided by a common controllable crystal holder.

Figure 4:
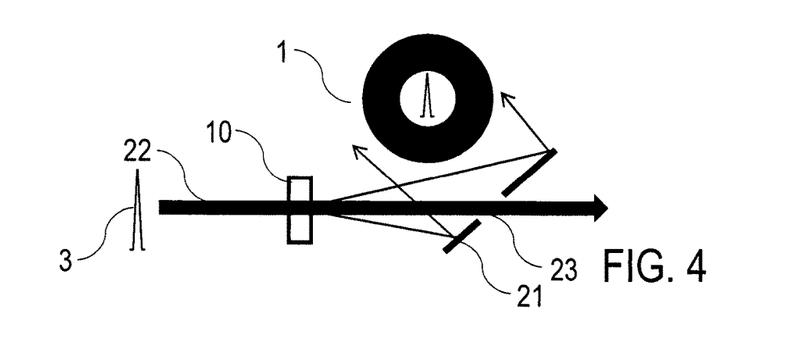

According to a further embodiment of the invention, an auxiliary mirror 21 having a through hole 23 can be arranged in the enhancement cavity as schematically illustrated in FIG. 4. The DF laser pulses 1 created in the first optically non-linear crystal 10 with a certain divergence are reflected at the auxiliary mirror 21, while the through hole 23 is adapted for passing the circulating laser pulse 3 along the beam path 22. The reflected DF laser pulses 1 (reflected MIR radiation) has a ring shape similar to the embodiment in FIG. 3.

Figure 5:
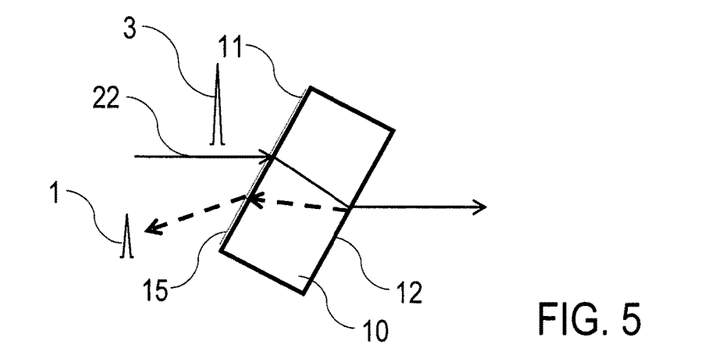

According to a further embodiment of the invention, as shown in FIG. 5, the DF laser pulses 1 can be output coupled from the enhancement cavity by using a reflecting dichroic surface 12 on the rear side of the first optically non-linear crystal 10 relative to the travel direction of the circulating laser pulse 3 and an antireflective coating 15 for all first second and third spectral components on the front side of the first optically non-linear crystal 10. The circulating laser pulse 3 arrives at the front side 11 of the first optically non-linear crystal 10, which is provided with the antireflective coating 15 adapted for a transmission of all of the first, second and third spectral components. In the optically non-linear crystal 10, the third components are generated, which are back-reflected at the dichroic surface coating 12 at the rear side of the crystal 10. Accordingly, the DF pulses 1 are reflected out of the beam path 22.

Figure 6:
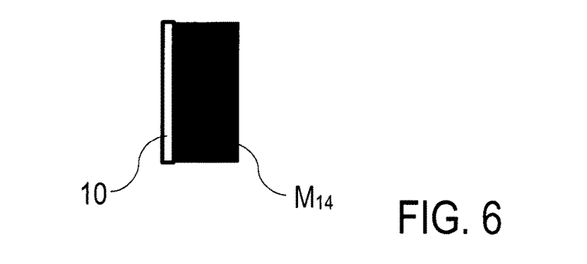
FIG. 6: a schematic illustration of an optically non-linear crystal directly coupled with one of the resonator mirrors of the enhancement cavity.

FIGS. 2 and 3 show the first optically non-linear crystal 10 arranged on adjusting and/or temperature-control support stage 13, 14. According to an alternative embodiment of the invention the crystal 10 can be in direct contact with one of the resonator mirrors, e.g. resonator mirror $M_{14}$, as shown in FIG. 6. A plane or curved surface of the crystal 10 contacts a plane or curved surface of the resonator mirror. The direct contact fulfils a double function in terms of mechanically supporting and tempering, in particular cooling, the crystal 10.

FIG. 7 schematically illustrates a second embodiment of the inventive photonic pulse source 100, which comprises the laser source 40, the first enhancement cavity 20, the first optically non-linear crystal 10 and additionally a second enhancement cavity 50. Although the first and second enhancement cavities 20, 50 are shown with plane resonator mirrors FIG. 7, a combination of plane and/or curved resonator mirrors can be used in practice.

With the embodiment of FIG. 7, each of the first and second enhancement cavities 20, 50 is arranged for coherent addition of one of the first and second spectral components of the ultrashort laser pulses, resp. Furthermore, the first and second enhancement cavities 20, 50 are coupled such that the beam path 22 (dashed line) of the first enhancement cavity 20 intersects the beam path 52 (drawn line) of the second enhancement cavity 50, wherein the first optically non-linear crystal 10 is arranged at the intersection of both paths 22, 52, and it is adapted for a DFG process with type I phase matching.

For separating the first and second spectral components of the ultrashort laser pulses 2 generated with the fs laser 41, the laser source 40 is provided with a dichroic beam splitter 43, which spatially separates e.g. the first spectral components (lower energy) from the second spectral components (higher energy) of the ultrashort laser pulses 2. On a first beam path 44, the first spectral components pass a polarizing component 45, e.g. a polarizing filter, which creates a first polarization direction (e.g. perpendicular to the first beam path 44 and parallel to the plane of drawing). This first pulse portion 2A of the ultrashort laser pulses 2 is coupled into the first enhancement cavity 20 via one of the resonator mirrors $M_{11}$.

In the second beam path 46 created by the beam splitter 43, a second polarizing component 47, e.g. a periscope of half wave plate, is arranged, which creates a polarization direction of the second spectral components perpendicular to the polarization direction of the first spectral components (e.g. perpendicular to the second beam path 46 and perpendicular to the plane of drawing). Additionally, the second beam path 46 includes a delay unit 48 comprising multiple plane delay mirrors $DL_1$ to $DL_4$, which are movable relative to each other. The second pulse portion 2B of the ultrashort laser pulses 2 comprising the second spectral components is coupled via one of the reflector mirrors $M_{21}$ into the second enhancement cavity 50. With the delay unit 48, the mutual temporal relationship of the first pulse portion 2A and the second pulse portion 2B of the ultrashort laser pulses 2 can be adjusted. The first and second beam paths 44, 46 can be modified by omitting one of the first and second polarizing components 45, 47. If the ultrashort laser pulses 2 generated by the fs laser 41 have a linear polarization, it is sufficient to provide one polarizing component, e.g. the polarizing component 47 only.

Both of the first and second pulse portions 2A, 2B of the ultrashort laser pulses 2 are coherently added in the first and second enhancement cavities 20, 50, respectively to first and second circulating pulses 3A, 3B, respectively. The temporal relationship of both circulating pulses 3A, 3B is adjusted with the delay unit 48 such that they are coherently superimposed in the first optically non-linear crystal 10 for driving the DFG process therein. The DF laser pulses 1 are emitted under a certain angle with respect to the surface of the first optically non-linear crystal 10, e.g. through a spacing between resonator mirrors.

The embodiment of FIG. 7 can be modified by coupling not only two enhancement cavities, but three or even more enhancement cavities. The ultrashort laser pulses 2 created by the fs laser 41 can be split onto three or more beam paths, where they are specifically manipulated, in particular with regard to the polarization and spectral composition thereof. For instance, three pulse portions can be coupled into the three enhancement cavities, respectively (not shown). Each of the three pulse portions comprises different spectral components of the driving ultrashort laser pulses. The three enhancement cavities can be arranged such that the pulse portions have different angles of incidence on the optically non-linear crystal. Accordingly, phase matching of different spectral components with the pulse portion in the first enhancement cavity can be improved.

The features of the invention in the above description, the drawings and the claims can be of significance both individually as well in combination or sub-combination for the realization of the invention in its various embodiments.

The invention claimed is:

1. A method of creating difference frequency (DF) laser pulses by difference frequency generation (DFG), comprising the steps of
providing a first femtosecond enhancement cavity with first resonator mirrors spanning a first beam path,
providing ultrashort laser pulses having a spectral bandwidth corresponding to a Fourier limit of below 20 fs and simultaneously containing first spectral components and second spectral components having larger frequencies than the first spectral components, wherein the first femtosecond enhancement cavity is configured for a coherent superposition of the ultrashort laser pulses,
input coupling and coherently adding of the ultrashort laser pulses in the first femtosecond enhancement cavity,
driving a DFG process by the ultrashort laser pulses in a first optically non-linear crystal being placed in the first beam path of the first femtosecond enhancement cavity, wherein the DF laser pulses are created in the first optically non-linear crystal by difference frequencies between the first and second spectral components, respectively, said difference frequencies comprising third spectral components being lower in frequency than both of the first and second spectral components,
wherein at least one circulating ultrashort laser pulse is created in the first femtosecond enhancement cavity, which drives the DFG process in the first optically non-linear crystal for generating the DF laser pulses, and the first femtosecond enhancement cavity is configured for recycling the at least one ultrashort laser pulse passing through the first optically non-linear crystal, and
output coupling of the DF laser pulses from the first femtosecond enhancement cavity, wherein the DF laser pulses have a center wavelength in a range of 4 µm to 20 µm and a spectral width of at least 500 nm.

2. The method according to claim 1, wherein the step of output coupling of the DF laser pulses comprises
reflecting the DF laser pulses out of the first beam path at a reflecting dichroic surface on a rear side of the first optically non-linear crystal and an antireflective coating on a front side of the first optically non-linear crystal.

3. The method according to claim 1, wherein the step of output coupling of the DF laser pulses comprises
transmitting the DF laser pulses out of the first beam path through a dichroic surface of the first resonator mirror downstream of the first optically non-linear crystal.

4. The method according to claim 1, wherein the step of output coupling of the DF laser pulses comprises
reflecting the DF laser pulses out of the first beam path at a surface of a dichroic plate arranged in the first femtosecond enhancement cavity.

5. The method according to claim 1, wherein the step of output coupling of the DF laser pulses comprises
relaying a divergent portion of the DF laser pulses over one of the first resonator mirrors or an auxiliary mirror with a hole transmitting the circulating ultrashort laser pulse in the first femtosecond enhancement cavity.

6. The method according to claim 1, wherein the step of providing the ultrashort laser pulses comprises
generating the ultrashort laser pulses with one single laser source.

7. The method according to claim 1, wherein the step of providing the ultrashort laser pulses comprises
suppressing spectral components of the ultrashort laser pulses, which do not contribute to the DFG process.

8. The method according to claim 1, including a step of adjusting a polarization of the first spectral components relative to a polarization of the second spectral components of the ultrashort laser pulses, so that the polarizations of the first and second spectral components are parallel or perpendicular relative to each other.

9. The method according to claim 8, wherein the polarizations of the first and second spectral components are adjusted before input coupling the ultrashort laser pulses into the first femtosecond enhancement cavity.

10. The method according to claim 1, including a step of placing a second optically non-linear crystal in the first beam path of the first femtosecond enhancement cavity, the second optically non-linear crystal being configured for compensating for an ellipticity of a polarization of the light field circulating in the first femtosecond enhancement cavity, said ellipticity being generated in the first optically non-linear crystal.

11. The method according to claim 10, wherein
the second optically non-linear crystal is further configured for creating further difference frequencies within the third spectral component by difference frequency generation.

12. The method according to claim 1, including further steps of
providing one or more further femtosecond enhancement cavities spanning one or more further beam paths, wherein each of the one or more further femtosecond enhancement cavities is arranged relative to the first femtosecond enhancement cavity such that the first optically non-linear crystal is placed at an intersection of all of the first and the one or more further beam paths of the first and the one or more further femtosecond enhancement cavities,
providing two or more pulse portions by wavelength selective splitting of the ultrashort laser pulses, wherein spectral content of the first and second spectral components is distributed into the two or more pulse portions,
input coupling each of the two or more pulse portions into one of the first and the one or more further femtosecond enhancement cavities and coherently adding the two or more pulse portions to at least two circulating ultrashort laser pulses each of which circulating in one of the first and the one or more further femtosecond enhancement cavities, respectively, wherein the polarizations of the two or more pulse portions are adjusted such that the two or more circulating ultrashort laser pulses in the first and the one or more further femtosecond enhancement cavities have different polarizations at the first optically non-linear crystal, and the DFG process is driven in the first optically non-linear crystal by the two or more circulating ultrashort laser pulses.

13. The method according to claim 12, wherein
the one or more further femtosecond enhancement cavities is at least two further femtosecond enhancement cavities, and each of the at least two further femtosecond enhancement cavities is arranged for coherently adding pulse portions with different spectral content and different polarizations.

14. The method according to claim 1, wherein
the first optically nonlinear crystal has a thickness in a range of 5 μm to 5 mm.

15. The method according to claim 1, wherein
the first optically nonlinear crystal is in direct contact with one of the resonator mirrors.

16. The method according to claim 1, wherein
a temperature of the first optically non-linear crystal is set by one of the first resonator mirrors or a temperature-control support stage, wherein the first optically non-linear crystal is optically contacted or attached to the one of the first resonator mirrors or the temperature-control support stage.

17. The method according to claim 1, wherein
an adjusting support stage of the first optically non-linear crystal is controlled for adjusting an orientation of the first optically non-linear crystal with respect to the first beam path of the first femtosecond enhancement cavity.

18. The method according to claim 1, wherein
the first femtosecond enhancement cavity is operated in an evacuated environment.

19. A photonic pulse source, configured for creating difference frequency (DF) laser pulses by difference frequency generation (DFG) according to the method of claim 1, comprising
a first optically non-linear crystal capable of creating the DF laser pulses by a DFG process driven with ultrashort laser pulses having a spectral bandwidth corresponding to a Fourier limit of below 20 fs and simultaneously containing first spectral components and second spectral components having larger frequencies than the first spectral components, wherein the DF laser pulses can be created by difference frequencies between the first and second spectral components, said difference frequencies comprising third spectral components being lower in frequency than both of the first and second spectral components, and
a first femtosecond enhancement cavity with first resonator mirrors spanning a first beam path, wherein
the first femtosecond enhancement cavity is configured for a coherent superposition of the ultrashort laser pulses,
the first optically non-linear crystal is placed in the first beam path,
one of the first resonator mirrors is arranged for input coupling of the ultrashort laser pulses into the first femtosecond enhancement cavity, and
the first femtosecond enhancement cavity further includes an output coupling component being arranged for output coupling of the DF laser pulses from the first femtosecond enhancement cavity, the DF laser pulses have a center wavelength in a range of 4 μm to 20 μm and a spectral width of at least 500 nm.

20. A photonic pulse source, configured for creating difference frequency (DF) laser pulses by difference frequency generation (DFG), comprising
a first optically non-linear crystal configured for creating the DF laser pulses by a DFG process driven with ultrashort laser pulses having a spectral bandwidth corresponding to a Fourier limit of below 20 fs and simultaneously containing first spectral components and second spectral components having larger frequencies than the first spectral components, wherein the DF laser pulses can be created by difference frequencies between the first and second spectral components, said difference frequencies comprising third spectral components being lower in frequency than both of the first and second spectral components, and
a first femtosecond enhancement cavity with first resonator mirrors spanning a first beam path, wherein
the first optically non-linear crystal is placed in the first beam path, wherein the first femtosecond enhancement cavity is configured for a coherent superposition of the ultrashort laser pulses,
one of the first resonator mirrors is arranged for input coupling of the ultrashort laser pulses into the first femtosecond enhancement cavity, and
the first femtosecond enhancement cavity further includes an output coupling component being arranged for output coupling of the DF laser pulses from the first femtosecond enhancement cavity, wherein the DF laser pulses have a center wavelength in a range of 4 μm to 20 μm and a spectral width of at least 500 nm.

21. The photonic pulse source according to claim 20, wherein the output coupling component comprises
a reflecting dichroic surface being arranged on a rear side of the first optically non-linear crystal for reflecting the DF laser pulses out of the first beam path and an antireflective coating being arranged on a front side of the first optically non-linear crystal,
a dichroic surface of one of the first resonator mirrors downstream of the first optically non-linear crystal, or
a surface of a dichroic plate arranged in the first femtosecond enhancement cavity.

22. The photonic pulse source according to claim 20, further including
one single laser source being arranged for providing the ultrashort laser pulses.

23. The photonic pulse source according to claim 20, further including
a spectral shaping component being configured for suppressing spectral components of the ultrashort laser pulses, which do not contribute to the DFG process.

24. The photonic pulse source according to claim 20, further including
an outer polarizer component being arranged for adjusting polarizations of the first and second spectral components before input coupling the ultrashort laser pulses into the first femtosecond enhancement cavity.

25. The photonic pulse source according to claim 20, further including
a second optically non-linear crystal being placed in the beam path of the first femtosecond enhancement cavity, wherein the second optically non-linear crystal is configured for a rotation of the polarization of the light field circulating in the first femtosecond enhancement cavity.

26. The photonic pulse source according to claim 20, further including
- one or more further femtosecond enhancement cavities spanning one or more further beam paths, wherein the one or more further femtosecond enhancement cavities are arranged relative to the femtosecond first enhancement cavity such that the first optically non-linear crystal is placed at an intersection of all of the first and the one or more further beam paths of the first and the one or more further femtosecond enhancement cavities,
- at least one dichroic beam splitter being arranged for providing wavelength selective splitting of the ultrashort laser pulses into two or more pulse portions, wherein spectral content of the first and second spectral components is distributed into the two or more pulse portions, and
- at least one polarizer component being arranged for adjusting a polarization of at least one of the two or more pulse portions, wherein
- the first and the one or more further femtosecond enhancement cavities are arranged for input coupling of each of the two or more pulse portions into one of the first and the one or more further femtosecond enhancement cavities and coherently adding the two or more pulse portions to two or more circulating ultrashort laser pulses each of which circulating in one of the first and the one or more further femtosecond enhancement cavities, respectively,
- the at least one polarizer component is configured for adjusting polarizations of the two or more pulse portions such that the two or more circulating ultrashort laser pulses in the first and the one or more further femtosecond enhancement cavities have different polarizations at the first optically non-linear crystal, and
- the first optically non-linear crystal is arranged such the DFG process can be driven therein by the two or more circulating ultrashort laser pulses.

27. The photonic pulse source according to claim 26, including
- the one or more further femtosecond enhancement cavities being at least two further femtosecond enhancement cavities, wherein each of the at least two further femtosecond enhancement cavities is arranged for coherently adding pulse portions with different spectral content and different polarizations.

* * * * *